(12) United States Patent
Kuiper et al.

(10) Patent No.: US 7,616,737 B2
(45) Date of Patent: Nov. 10, 2009

(54) FLUID FILLED DEVICES

(75) Inventors: Stein Kuiper, Eindhoven (NL); Derk Visser, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 834 days.

(21) Appl. No.: 10/546,394

(22) PCT Filed: Feb. 19, 2004

(86) PCT No.: PCT/IB2004/050133

§ 371 (c)(1), (2), (4) Date: Aug. 18, 2005

(87) PCT Pub. No.: WO2004/077125

PCT Pub. Date: Sep. 10, 2004

(65) Prior Publication Data

US 2006/0245092 A1    Nov. 2, 2006

(30) Foreign Application Priority Data

Feb. 25, 2003   (EP)   .................. 03075556

(51) Int. Cl.
*G21K 3/00* (2006.01)
(52) U.S. Cl. .................. 378/158; 369/112.01; 359/883; 359/666
(58) Field of Classification Search .................. 369/112; 359/883, 228, 666, 665; 345/84, 107
See application file for complete search history.

(56) References Cited

U.S. PATENT DOCUMENTS

| 4,079,368 | A | 3/1978 | DiStefano |
| 4,582,391 | A | 4/1986 | Legrand |
| 5,659,330 | A * | 8/1997 | Sheridon ...................... 345/84 |
| 5,956,005 | A * | 9/1999 | Sheridon ...................... 345/84 |
| 6,369,954 | B1 | 4/2002 | Berge et al. |
| 7,327,524 | B2 * | 2/2008 | Renders et al. ............. 359/666 |
| 2001/0017985 | A1 | 8/2001 | Tsuboi et al. |
| 2002/0080920 | A1 | 6/2002 | Prins et al. |

FOREIGN PATENT DOCUMENTS

| EP | 1069450 A1 | 1/2001 |
| JP | 2001249262 A | 9/2001 |
| WO | 0239462 A2 | 5/2002 |
| WO | 02069016 A1 | 9/2002 |

OTHER PUBLICATIONS

VARIOPTC: Integrated Solid State Sensor with motionless Adaptive Optic Using Electro Wetting Surface Control, Dec. 2002, pp. 1-3.
ISR Publication, International Publication No. W02004/077125A1.

* cited by examiner

*Primary Examiner*—Ali Neyzari

(57) ABSTRACT

A device (100; 200; 300; 400) comprising a sealed cavity (210) containing n volumes of fluids (80, 87; 220, 230; 320, 332; 420, 422, 430, 432) is described, where n is an integer and $n \geq 2$. Each volume of fluid is substantially immiscible with every contiguous volume of fluid. The cavity is defined by an interior surface divided into n continuous areas (60, 170; 260, 270; 360, 362, 370; 460, 462, 470, 472), each continuous area corresponding to and being in contact with a respective one of the volumes of fluid. The wettability of each area is such that each volume of fluid preferentially adheres to the corresponding continuous area rather than any one of the continuous areas adjacent to the corresponding area.

8 Claims, 6 Drawing Sheets

FLUID FILLED DEVICES

FIELD OF THE INVENTION

The present invention relates to fluid filled devices, and in particular to those devices comprising a sealed cavity. The present invention is particularly suitable for use in electrowetting devices.

BACKGROUND OF THE INVENTION

Fluid filled devices are devices that contain at least two fluids (i.e. multi-fluid filled devices), with the device typically being arranged to perform a function by displacing (changing the position or shape of) a volume of at least one of the fluids.

Optical fluid filled devices can for instance function as lenses, diaphragms, gratings, shutters, optical switches or filters. Examples of optical fluid filled devices, as well as different possible methods of displacing the fluids such as by using electrowetting, are described within WO 02/069016.

Electrowetting devices are devices that utilise the electrowetting phenomenon to operate. In electrowetting, the three-phase contact angle is changed with applied voltage. The three-phases constitute two fluids and a solid. The term fluid encompasses both liquids and gases. Typically, at least the first fluid is a liquid; the second fluid may be a liquid, or a gas or vapour.

EP 1,069,450 describes an optical device that utilises the electrowetting effect so as to act as a variable density optical filter. FIG. 1 is a cross-sectional view of such a typical optical device 90. The optical device 90 has two immiscible fluids 80, 87 confined in a sealed space 92, (i.e. a chamber, or cavity). The term immiscible indicates that the two fluids do not mix. The first fluid 80 is an insulator (e.g. silicone oil) and the second fluid 87 electroconductive (e.g. a mixture of water and ethyl alcohol). The first fluid 80 and the second fluid 87 have different light transmittances.

A voltage from a voltage supply 40 can be applied to the two electrodes 41, 42 so as to produce an electric field between the fluid 87 and the electrode 42 (an insulating layer 50 prevents the second electrode 42 contacting the conductive second fluid).

By varying the voltage applied to the second fluid 87, the shape of an interface 85 between the first fluid 80 and the second fluid 87 is altered, so as to change the overall transmittance of the optical element. It is also known to provide a variable lens utilising a similar configuration, but with the two fluids 80, 87 having different refractive indices.

The device 90 in FIG. 1 has a water-repellent film 60 of diameter D1 on the insulating layer 50, surrounded by a ring of a hydrophilic agent 70 so as to locate the first fluid 20. The shape of the interface 85 changes during the operation of the device. The change in shape may result in the fluid 80 extending from the water-repellent layer 60 to the opposite surface of the sealed space. In order to prevent the first fluid 80 adhering to the opposite surface, a portion of the opposite surface is coated with a layer of hydrophilic film 72 of diameter D2.

In order to limit the action of gravity upon the interface 25, the two fluids 80, 87 may be of equal density.

It is an aim of embodiments of the present invention to provide an improved electrowetting device. It is an aim of embodiments of the present invention to provide an electrowetting device that has improved stability, particularly when subjected to accelerative forces.

STATEMENTS OF THE INVENTION

In one aspect, the present invention provides a device comprising a sealed cavity containing n volumes of fluids, where n is an integer and $n \geq 2$, each volume of fluid being substantially immiscible with every contiguous volume of fluid, the cavity being defined by an interior surface divided into n continuous areas, each continuous area corresponding to and being in contact with a respective one of the volumes of fluid, the wettability of each area being such that each volume of fluid preferentially adheres to the corresponding continuous area rather than any one of the continuous areas adjacent to the corresponding area.

By providing a sealed cavity having such a structure, the likelihood of a volume of fluid adhering to an incorrect portion of the internal surface of the cavity is greatly diminished. Consequently, the stability of the device when subjected to accelerative forces is improved. Further, any small amounts of one fluid that have dissolved in another fluid are prevented from condensing on an incorrect surface.

In another aspect, the present invention provides an optical scanning device for scanning an information layer of an optical record carrier, the device comprising a radiation source for generating a radiation beam and an objective system for converging the radiation beam on the information layer, wherein the optical scanning device comprises a device comprising a sealed cavity containing n volumes of fluids, where n is an integer and $n \geq 2$, each volume of fluid being substantially immiscible with every contiguous volume of fluid, the cavity being defined by an interior surface divided into n continuous areas, each continuous area corresponding to and being in contact with a respective one of the volumes of fluid, the wettability of each area being such that each volume of fluid preferentially adheres to the corresponding continuous area rather than any one of the continuous areas adjacent to the corresponding area.

In a further aspect, the present invention provides a method of manufacturing a device, the method comprising: providing a cavity having an interior surface divided into n continuous areas, where n is an integer and $n \geq 2$; filling the cavity with n volumes of fluid, each volume of fluid being substantially immiscible with every contiguous volume of fluid such that each continuous area corresponds to and is in contact with a respective one of the volumes of fluid; and sealing the cavity, wherein the wettability of each area is such that each volume of fluid preferentially adheres to the corresponding continuous area rather than any one of the continuous areas adjacent to the corresponding area.

In another aspect, the present invention provides a method of manufacturing an optical scanning device for scanning an information layer of an optical record carrier, the method comprising the steps of: providing a radiation source for generating a radiation beam; providing a device, the device comprising a sealed cavity containing n volumes of fluids, where n is an integer and $n \geq 2$, each volume of fluid being substantially immiscible with every contiguous volume of fluid, the cavity being defined by an interior surface divided into n continuous areas, each continuous area corresponding to and being in contact with a respective one of the volumes of fluid, the wettability of each area being such that each volume of fluid preferentially adheres to the corresponding continuous area rather than any one of the continuous areas adjacent to the corresponding area.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF PREFERRED EMBODIMENTS

Figure 1:
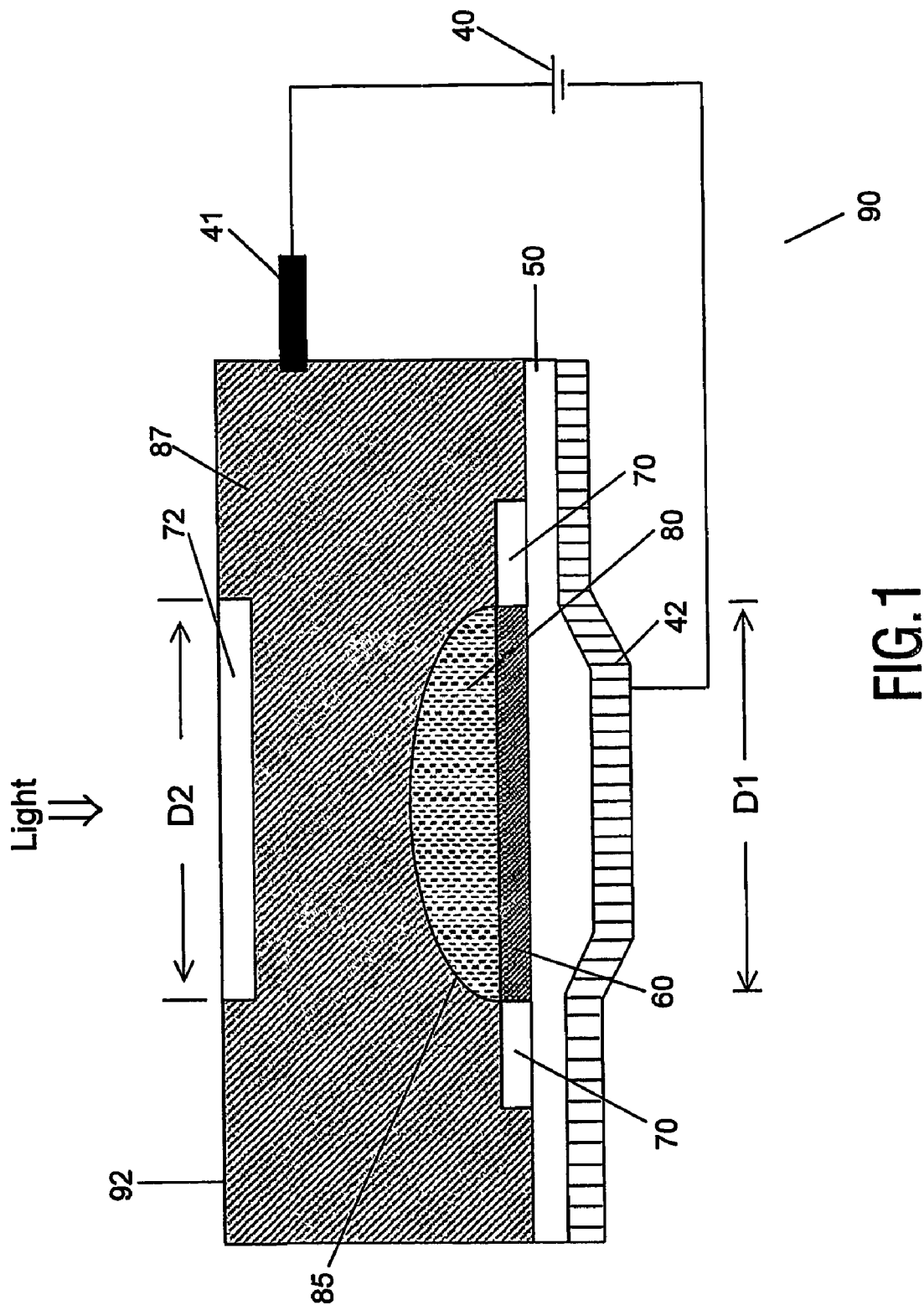
FIG. 1 illustrates a cross-sectional view of a known electrowetting device.
Figure 2:
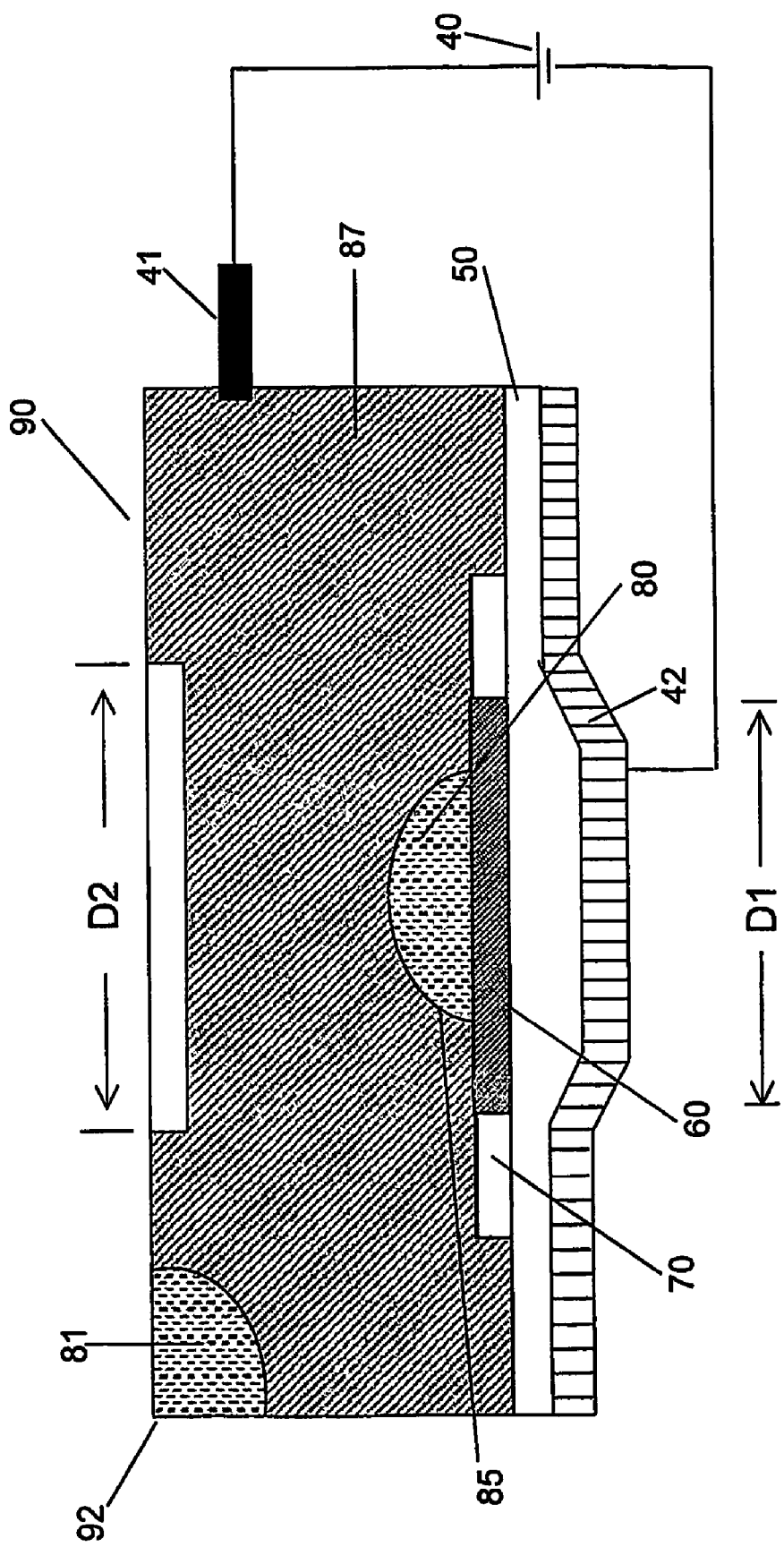
FIG. 2 illustrates a cross-sectional view of the device shown in FIG. 1, illustrating how the device could be disturbed.

The present inventors have realised that it is possible for the device 90 shown in FIG. 1 to be disturbed, such that both bodies of liquids do not stay entirely in the desired positions. For instance, a portion 81 of the fluid 80 might become lodged in a corner of the device, as shown in FIG. 2. This situation could arise if the two liquids were not completely immiscible. For instance, small (e.g. sub-micrometer sized) droplets of the fluid 20 within the fluid 30 might stick to, and accumulate on, a portion of the interior surface of the device 10. Alternatively, the situation could arise if the device 90 was subjected to accelerative forces e.g. it was shaken or dropped.

Displacing a portion of the liquid from its desired location (or, indeed, the entire liquid) is undesirable, as it will effect the performance of the device. The shape of the interface 85 between the two fluids 80, 87 is partly dependent upon the volume of the first fluid 80. Consequently, if the volume of the first fluid 80 is decreased, then the shape of the interface 85 as a function of the applied voltage will be effected. This will change the performance of the device 90, and impair the function of the device as a variable filter (or as a lens, depending upon the properties of the fluids 20, 30).

The present inventors have realised that, for such a two fluid system, this problem can be overcome by dividing the complete interior surface into two separate areas, each area corresponding to and preferentially attracting one of the two respective fluids. This is achieved by providing areas of the device having different wettabilities for each fluid, such that each fluid will be attracted to a respective area. Wettability is the extent by which a solid is wetted (covered) by a fluid. The term "divided into" means that the surface areas are adjacent or contiguous, (i.e. substantially without intermediate areas) as well as continuous (i.e. each of the areas does not include any substantial intervening areas arranged to attract another fluid). The maximum width of such intermediate or intervening areas is smaller than the diameter of a droplet that could be formed in the fluids. Preferably, the maximum width of such areas is less than 100 μm, and more preferably less than 10 μm. Consequently, if such a droplet would touch such an intermediate area, it would not adhere because the intermediate area does not provide sufficient contact area with the droplet.

Figure 3:
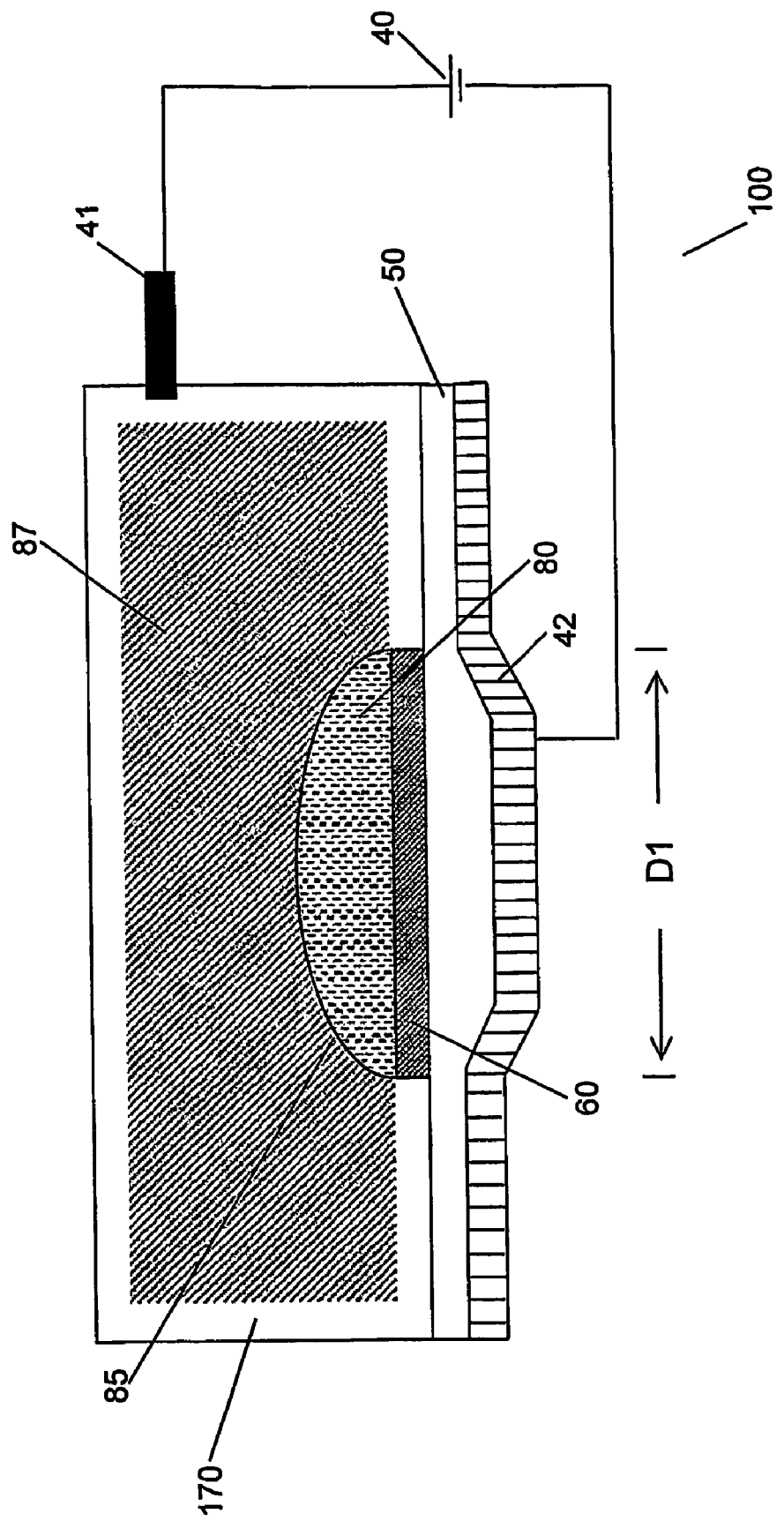
FIG. 3 illustrates a cross-sectional view of a device in accordance with a first embodiment of the present invention.

FIG. 3 illustrates a cross-sectional view of a device 100 in accordance with a first embodiment of the present invention. The device 100 generally corresponds to the device 90 illustrated in FIGS. 1 and 2, with identical reference numerals indicating similar features. The device 100 has an area of diameter D1 of a hydrophobic surface 60 arranged to attract the non-conducting non-polar first fluid 80. The remainder of the interior surface is covered with a hydrophilic coating 170 that is preferentially wetted by (i.e. it attracts) the conducting polar fluid 87. This prevents the situation shown in FIG. 2 of a portion of the liquid volume 80 adhering in an undesired manner to a portion of the interior cavity. Instead, if undesired droplets are formed, the droplets will not adhere to undesired parts of the interior surface, but keep moving about until they coalesce with the volume of liquid from which they were split off, thereby returning to the desired configuration of the fluids.

In this particular embodiment, the electrode 41 is in electrical contact with the conducting polar fluid 87, whilst the surface of the electrode (which forms a portion of the interior surface of the sealed cavity) is hydrophilic. The surface of the electrode may be naturally hydrophilic. Alternatively, a conductive hydrophilic coating may be applied to the complete surface area 170, or only to the electrode (or the portion of the electrode that forms part of the interior surface of the cavity).

In other embodiments, the coating covering the electrode 41 is not electrically conducting i.e. it is an insulator. For instance, the hydrophilic insulator Silicon Oxide could be used. Electrowetting will still occur due to capacitive coupling, but at a somewhat higher voltage. If the insulating coating is thin compared to the insulating layer covering the counter electrode 42, then the required voltage increase will be minimal.

Figure 4:
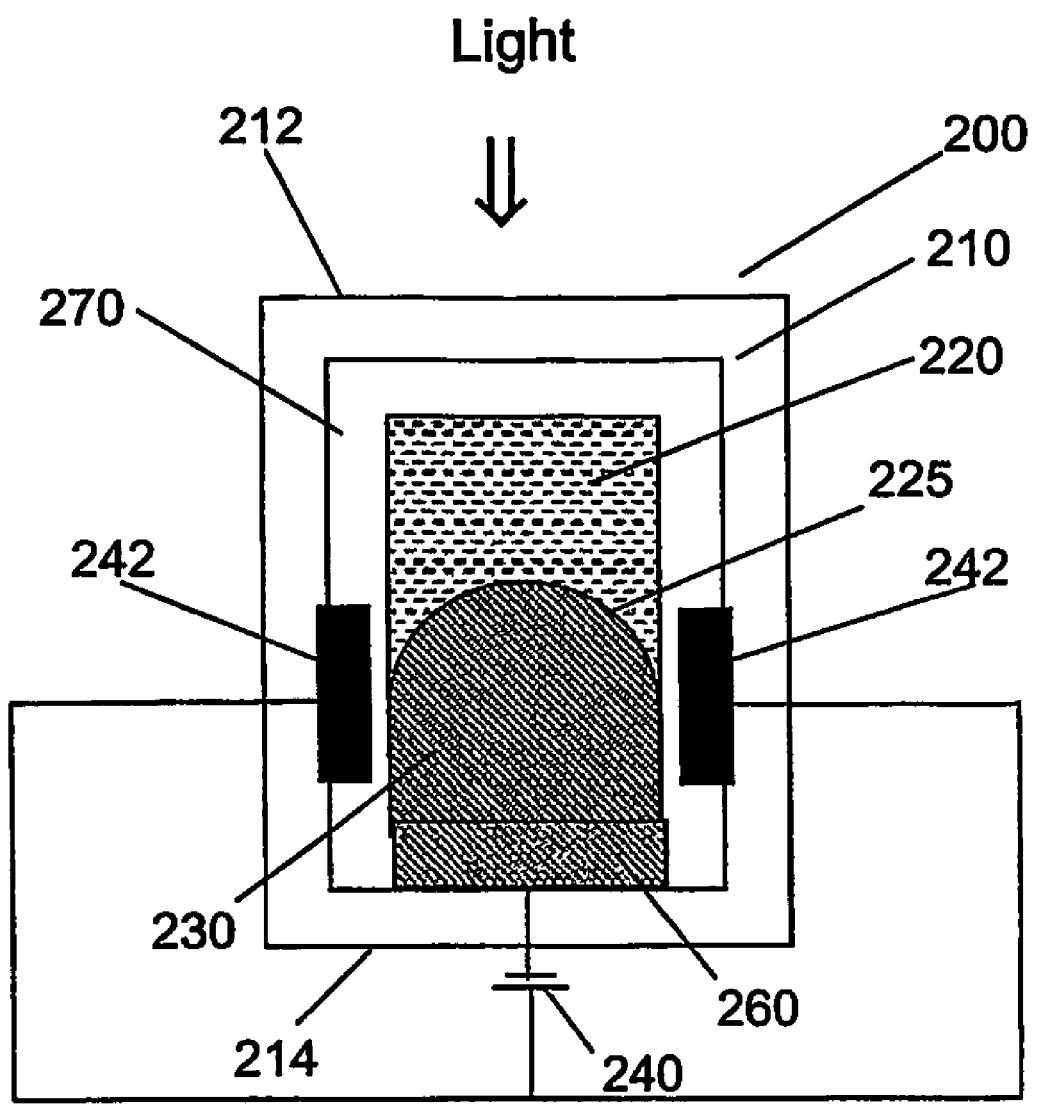
FIG. 4 illustrates a cross-sectional view of a device in accordance with a further embodiment of the present invention.

FIG. 4 illustrates a device 200 in accordance with a further embodiment of the present invention. The device 200 is again an optical device (i.e. it is arranged to alter the properties of light incident upon the device), and in this instance the device 200 is arranged to act as a variable-focus lens.

The device 200 comprises a first fluid 220 and a second fluid 230, the two fluids being immiscible. The first fluid 220 is a non-conducting non-polar liquid, such as a silicone oil or an alkane. The second fluid 230 is a conducting or polar liquid such as water containing a salt solution (or a mixture of water and ethylene glycol).

The two fluids 220, 230 are preferably arranged to have an equal density, so as to minimise the gravitational effects between the two liquids such that the lens functions independently of orientation. The two fluids 220, 230 have different refractive indices, such that the interface 225 between the two fluids will act as a lens.

Varying the shape of the interface 225 will vary the focal length of the lens. The shape of the interface 225 is adjusted by the electrowetting phenomenon, by applying a voltage between the electrodes 260 and the electrode 242 so as to alter the contact angle of the fluid and the walls of the device 200.

So as to allow the transmission of light through the device, at least opposite faces of the device (in the orientation shown in the figure, top and bottom surfaces) are transparent. In this particular embodiment, the device takes the form of a cylinder 210, with light entering and exiting through the transparent ends 212, 214 of the cylinder. The fluids 220, 230 are enclosed within the sealed space defined by the cylinder 210. One end 260 of the interior surface of the cylinder 210 is hydrophilic so as to attract the polar fluid 230. The remainder of the cylinder 210 (i.e. the opposite end, and the interior side walls) is coated with a hydrophobic coating 270.

The hydrophilic area 260 may be formed entirely of a hydrophilic material (e.g. glass), or alternatively coated with a hydrophilic layer (e.g. silicon dioxide).

In this particular embodiment, the hydrophilic area 260 of the interior surface is completely covered by a transparent hydrophilic conductor (e.g. Indium Tin Oxide), so as to form an electrode.

A voltage is supplied from variable voltage source 240 across the polar liquid 230 by the transparent electrode 260 and an annular electrode 242 extending around the device 200 in proximity to the three-phase line. The electrode 242 is not in conductive contact with the polar fluid 230.

By arranging for one area of the interior surface of the cylinder to be hydrophilic, with the remainder of the interior surface being hydrophobic, then it will be appreciated that in this two fluid system the stability of the device will be greatly enhanced. The polar fluid will not adhere to any portion of the interior surface where it is desired to have only the non-polar fluid, and vice versa.

It should be noted that this condition does not prohibit the polar fluid 230 being in contact with part of the hydrophobic coating 270. The purpose of the hydrophilic layer is to locate the polar fluid i.e. to keep the polar fluid in a desired position (with the position often defining at least in part the shape). Thus, a relatively small hydrophilic area may be suitable for this purpose. For instance, the whole of the interior surface of a device could be hydrophobic, apart from those areas in which it is necessary to keep the polar fluid(s) in a certain shape or position.

Electrowetting can be used to increase the wettability of a polar or conducting fluid on a surface. If this wettability is initially small (for a polar liquid this is usually termed a hydrophobic surface, e.g. a Teflon-like surface), a voltage can be used to make it larger. If the wettability is initially large (for a polar liquid this is usually called a hydrophilic surface, e.g. silicon dioxide) then applying voltage will have relatively little effect. It is therefore preferable that in electrowetting devices the three-phase line is initially in contact with a hydrophobic layer.

Figure 5:
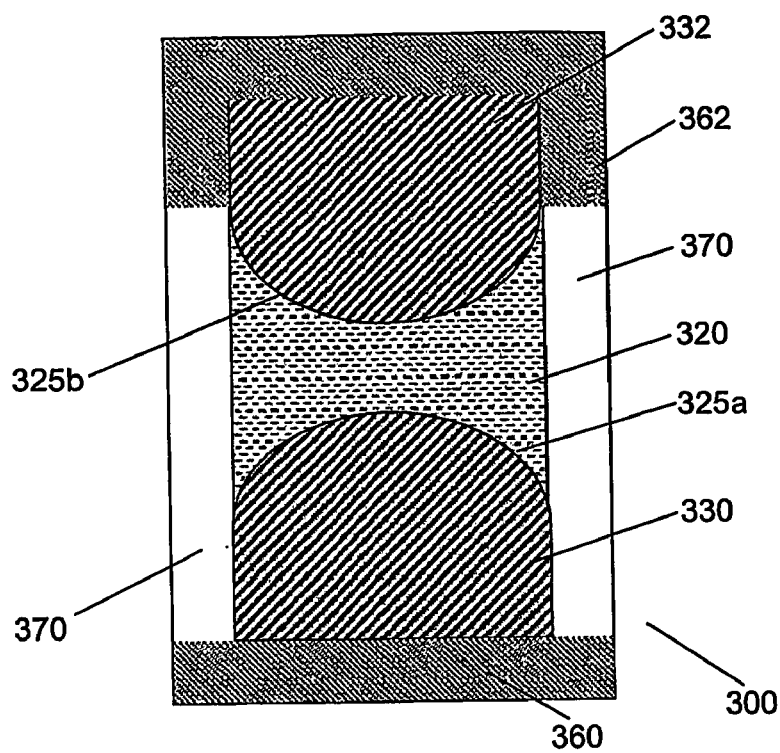
FIG. 5 illustrates a cross-sectional view of a device in accordance with another embodiment of the present invention.
Figure 6:
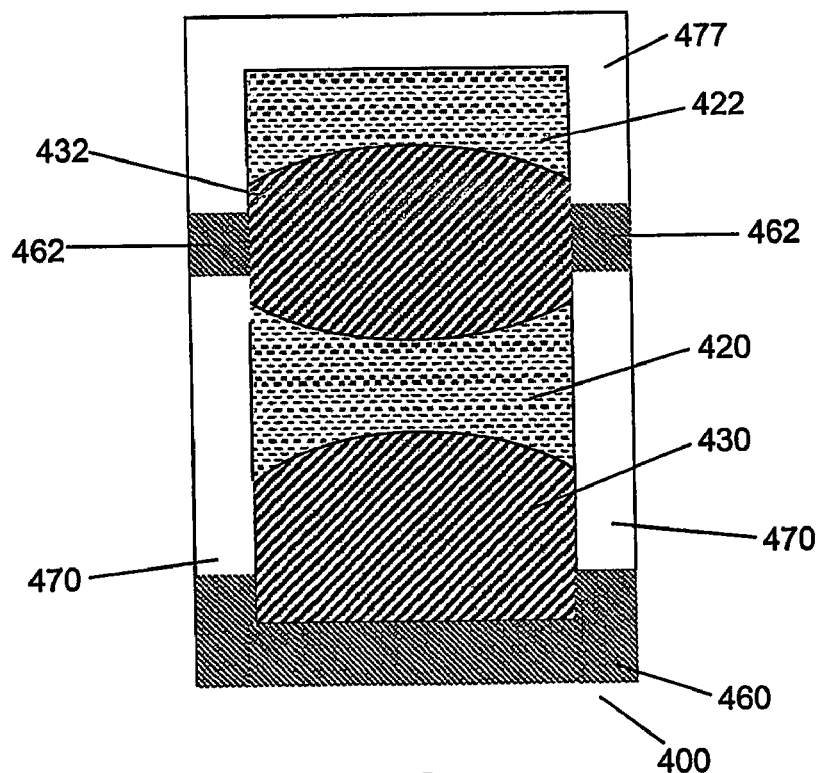
FIG. 6 illustrates a cross-sectional view of a device in accordance with a further embodiment of the present invention.

It will also be appreciated that the present invention can be applied to electrowetting devices comprising more than two fluids, as shown by way of example in FIGS. 5 and 6. The present invention can be applied to any device having n volumes of fluid, where n≧2, n being the number of intended volumes of fluid according to the design of the device.

FIG. 5 illustrates an electrowetting device 300 comprising two volumes of polar fluids 330, 332, separated by a volume of non-polar fluid 320. The polar fluids 330, 332 may be identical, or alternatively different fluids. Preferably, each fluid is non-miscible with the adjacent fluid with which it forms an interface 325a, 325b. More preferably, all of the fluids are immiscible with respect to each other. Preferably, each fluid is of substantially similar density.

The interior surface of the device 300 is divided up into three distinct areas 360, 370, 362, with each area corresponding to a respective volume of fluid 330, 320, 332. The properties of each continuous area 360, 370, 362 are such that each area will preferentially attract the corresponding fluid rather than the adjacent connecting fluid. For instance, areas 360, 362 will be hydrophilic, whilst area 370 will be hydrophobic.

It is appreciated that this arrangement of interior surfaces will not completely prohibit the incorrect positioning of the fluids e.g. a portion of the volume of fluid 330 may end up adhering to the hydrophilic layer 362 if the device 300 is violently shaken. However, due to the arrangement of the interior surfaces, for any portion of the polar fluid 330 to contact the area 362, it would first need to traverse the volume of fluid 320 surrounded by the area 370. Thus, the likelihood of the fluid 330 adhering to an undesired portion of the interior surface of the device 300 is greatly diminished, so as to provide a relatively stable device.

FIG. 6 shows an example of an electrowetting device 400 comprising four separate fluids 420, 430, 422, 432. Each volume of fluid is immiscible with the adjacent fluid. Further, each volume of fluid is in contact with a respective area to which that volume of fluid preferentially adheres (rather than to any one of the continuous areas adjacent to the corresponding area). For instance, fluid volume 432 preferentially adheres to the annular interior surface area 462, rather than to either of the adjacent areas 477, 470. Equally, fluid 430 preferentially adheres to the area 460 rather than to the adjacent area 470 (which corresponds to fluid 420).

For convenience, no electrodes are illustrated with respect to either the electrowetting device 300 illustrated in FIG. 5, or the electrowetting device 400 illustrated in FIG. 6.

It will be appreciated that the above embodiments are provided by way of example only.

It will be appreciated that the areas of different wettability can be formed entirely from a hydrophobic or a hydrophilic material. Alternatively, the areas can be formed by coating other materials with hydrophobic or hydrophilic substances e.g. by dip coating or by chemical vapour deposition.

The devices may be any multi-fluid filled devices, and are not limited to devices that utilise the electrowetting phenomenon to operate.

The devices can comprise any desired shape. For instance, an electrowetting device in accordance with the present invention could be shaped as described within WO 00/58763.

The devices may be optical devices, or form part of optical devices or indeed any other type of device.

Figure 7:
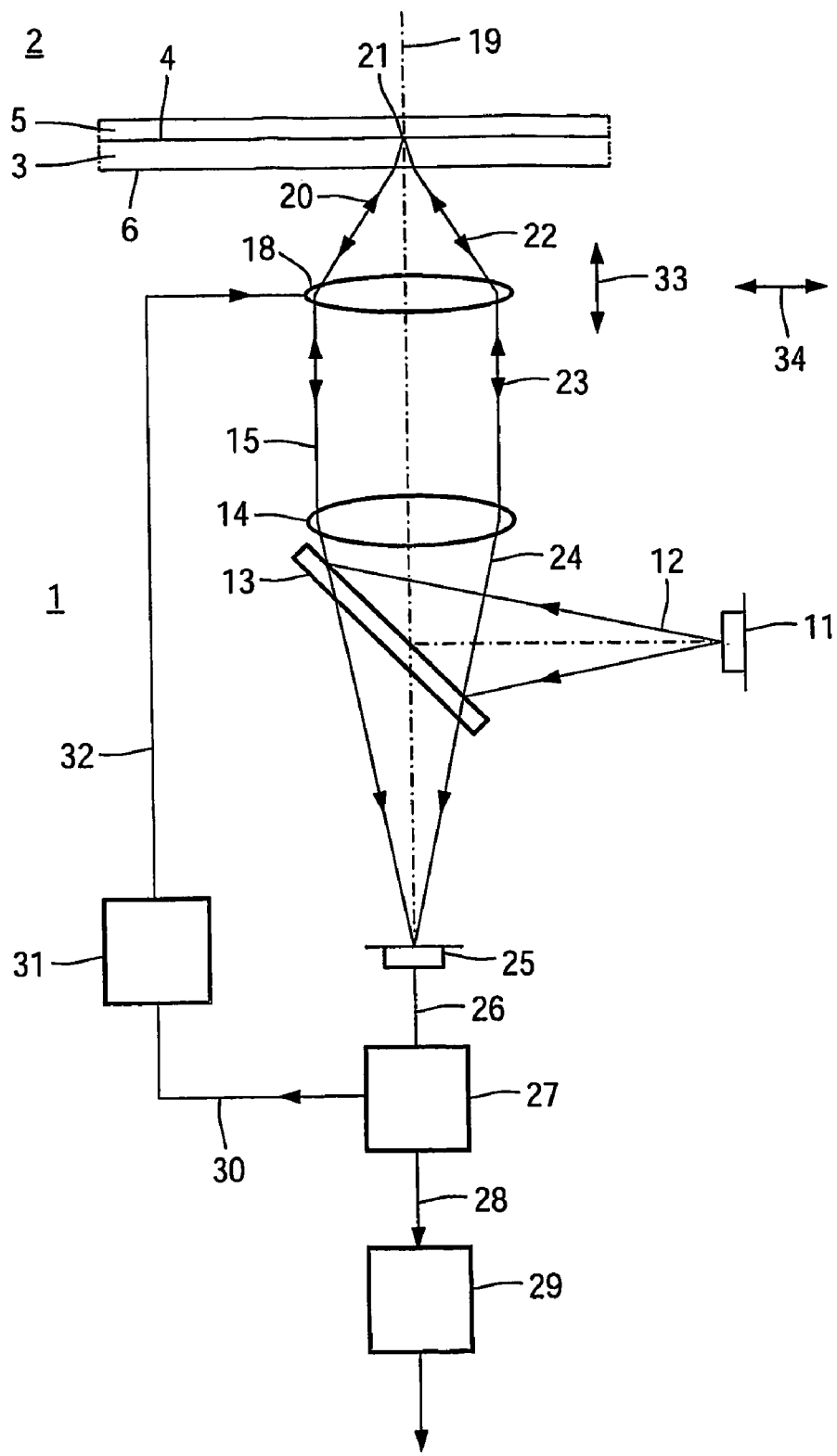
FIG. 7 illustrates a device for scanning an optical record carrier including an electrowetting device in accordance with an embodiment of the present invention.

FIG. 7 illustrates a device 1 for scanning an optical record carrier 2, including an objective lens system lens 18 comprising a variable focus lens in accordance with an embodiment of the present invention. In this particular embodiment, the variable focus lens 18 corresponds to the electrowetting device 200 illustrated in FIG. 4. However, it will be appreciated that other embodiments may use other fluid filled devices to perform any desired optical functions. For instance, a suitable device could be used as any lens having an adjustable strength, or as an adjustable diaphragm, or as a wavefront correcting element (e.g. for introducing an adjustable amount of spherical aberration in the radiation beam passing through the element) in a scanning device.

FIG. 7 shows a device 1 for scanning an optical record carrier 2, including an objective lens 18. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer.

Alternatively, the transparent layer may have the sole function of protecting the information layer, while the mechanical support is provided by a layer on the other side of the information layer, for instance by the protection layer 5 or by a further information layer and a transparent layer connected to the information layer 4.

Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

The scanning device 1 comprises a radiation source 11 that can emit a radiation beam 12. The radiation source may be a semiconductor laser. A beam splitter 13 reflects the diverging radiation beam 12 towards a collimator lens 14, which converts the diverging beam 12 into a collimated beam 15. The collimated beam 15 is incident on an objective system 18.

The objective system may comprise one or more lenses and/or a grating. The objective system 18 has an optical axis 19. The objective system 18 changes the beam 17 to a converging beam 20, incident on the entrance face 6 of the record carrier 2. The objective system has a spherical aberration correction adapted for passage of the radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals.

One of the signals is an information signal 28, the value of which represents information read from the information layer 4. The information signal is processed by an information processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot. The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of track to be followed in the information layer 4. The tracks in the Figure run in a direction perpendicular to the plane of the Figure.

The device of FIG. 7 in this particular embodiment is adapted to scan also a second type of record carrier having a thicker transparent layer than the record carrier 2. The device may use the radiation beam 12 or a radiation beam having a different wavelength for scanning the record carrier of the second type. The NA of this radiation beam may be adapted to the type of record carrier. The spherical aberration compensation of the objective system must be adapted accordingly.

By providing a device having such an interior surface as described above, the likelihood of the volume of fluid adhering to an incorrect portion of the internal surface of the device is greatly diminished. Consequently, the stability of the device is improved. This is particularly advantageous if the device is used in a portable unit such as a portable CD (Compact Disc) or DVD (Digital Versatile Disc) player.

The invention claimed is:

1. A device (100; 200; 300; 400) comprising a sealed cavity (210) containing n volumes of fluids (80, 87; 200, 230; 320, 330, 332; 420, 422, 430, 432), where n is an integer and n☐2, each volume of fluid being substantially immiscible with every contiguous volume of fluid, the cavity (210) being defined by an interior surface divided into n continuous areas (60, 170; 260, 270; 360, 362, 370; 460, 462, 470, 472), each continuous area corresponding to and being in contact with a respective one of the volumes of fluid, the wettability of each area being such that each volume of fluid preferentially adheres to the corresponding continuous area rather than any one of the continuous areas adjacent to the corresponding area.

2. A device as claimed in claim 1, wherein at least one of said continuous areas comprises an electrode (42; 242) covered by an electrically insulating layer (50; 270).

3. A device as claimed in claim 1 or claim 2, wherein at least one of said continuous areas comprises the surface of an electrode (41; 260).

4. A device as claimed in any one of the above claims, wherein n=2.

5. A device as claimed in any one of the above claims, wherein each of said fluids is a liquid (80, 87; 220, 230; 320, 332; 420, 422, 430, 432).

6. A device as claimed in any one of claims 1 to 4, wherein at least one of said fluids is a gas or vapour.

7. A device as claimed in any one of the above claims, wherein each fluid (80, 87; 220, 230; 320, 332; 420, 422, 430, 432) has a substantially similar density.

8. A method of manufacturing a device (50, 87; 220, 230; 320, 332; 420, 422, 430, 432), the method comprising:
providing a cavity (210) having an interior surface divided into n continuous areas (60, 170; 260, 270; 360, 362, 370; 460, 462, 470, 472), where n is an integer and n☐2;
filling the cavity with n volumes of fluid (80, 87; 220, 230; 320, 332; 420, 422, 430, 432), each volume of fluid being substantially immiscible with every contiguous volume of fluid such that each continuous area corresponds to and is in contact with a respective one of the volumes of fluid; and
sealing the cavity, wherein the wettability of each area is such that each volume of fluid preferentially adheres to the corresponding continuous area rather than any one of the continuous areas adjacent to the corresponding area.

* * * * *